United States Patent [19]

Hisamatsu et al.

[11] 3,864,133

[45] Feb. 4, 1975

[54] PHOTO-POLYMERIZABLE COMPOSITIONS

[75] Inventors: Hiroyoshi Hisamatsu, Tsurugashima-machi; Katutoshi Takahashi; Masanori Takase, both of Urawa; Michihiko Shiraishi, Kawaguchi, all of Japan

[73] Assignee: Dainippon Ink and Chemicals, Incorporated, Tokyo, Japan

[22] Filed: Oct. 19, 1973

[21] Appl. No.: 408,094

Related U.S. Application Data

[63] Continuation of Ser. No. 171,000, Aug. 11, 1971, abandoned.

[30] Foreign Application Priority Data

Aug. 11, 1970 Japan ............................ 45-169689
Oct. 27, 1970 Japan ............................ 45-93967

[52] U.S. Cl. .............. 96/115 P, 96/35.1, 96/115 R, 204/159.15, 204/159.19, 204/159.23

[51] Int. Cl. .............................................. G03c 1/70

[58] Field of Search ............ 96/115 P, 35.1, 115 R; 204/159.15, 159.19, 159.23

[56] References Cited

UNITED STATES PATENTS

| | | | |
|---|---|---|---|
| 2,948,611 | 8/1960 | Barney | 96/115 P |
| 3,658,531 | 4/1972 | Kurtz | 96/35.1 |
| 3,677,920 | 7/1972 | Kai et al. | 96/115 P |
| 3,782,961 | 1/1974 | Takahashi et al. | 96/115 P |

*Primary Examiner*—Ronald H. Smith
*Attorney, Agent, or Firm*—Sherman & Shalloway

[57] ABSTRACT

Photo-polymerizable compositions which comprise a combination of a compound containing an ethylenically unsaturated double bond and urethane linkage, with at least one radical or linkage selected from the group consisting of secondary amino radical, tertiary amino radical, and urea linkage; and photo-polymerization initiator.

7 Claims, No Drawings

PHOTO-POLYMERIZABLE COMPOSITIONS

This is a continuation of application Ser. No. 171,000, filed Aug. 11, 1971, now abandoned.

This invention relates to photo-polymerizable compositions which are capable of very notable photo-polymerization induced by the action of active light in the optional presence of air, to form high molecular weight substances.

It is well known that irradiation of ethylenically unsaturated compounds in general with active light induces photo-polymerization in most cases, to form polymers, and that in such procedures, a photo-polymerization initiator may be used for further promoting the polymerization reaction. Many photo-polymerizable compositions based on the above basic concept have been disclosed in the literature.

However, while the known types of ethylenically unsaturated compounds can start the polymerization reaction upon exposure to active light, in the presence of air they are subject to strong polymerization-inhibiting action of oxygen radicals, and therefore the polymerization does not take place until the oxygen present in the polymerizable substances is consumed by the initiating radical supplied by the photo-polymerization initiator. Accordingly, this type of polymerization reaction passes through a preliminary stage which is conventionally referred to as the induction period. Thus, it is necessary when polymerizing photo-polymerizable substances in the presence of air, to reduce the polymerization-inhibiting action of oxygen in particular to shorten the induction period. Unless some moderating means of the polymerization-inhibiting action of oxygen is adopted, irradiation of active light of extremely high intensity must be continued for many hours before initiation of the polymerization reaction, particularly at the surface portions of photo-polymerizable substance which are in contact with air. In the worst cases, no substantial polymerization takes place even after many hours of photo-irradiation.

One of the most widely employed means to moderate the polymerization-inhibiting action of oxygen is addition of wax to the photopolymerizable substances to be polymerized. The wax migrates to the surfaces of the photo-polymerizable substances in the course of the polymerization reaction, to form a protective film thereon to intercept the oxygen in the air, thereby reducing the polymerization-inhibiting action of oxygen. However, normally 1 – 3 minutes are required for the wax to form the protective film at the surfaces of photo-polymerizable substances. Therefore, it is still difficult to shorten the induction period at the surface portions which are contacting oxygen, to less than the time required for the formation of such protective film. In short, it is still a problem to be solved, to find a method for very quickly, and certainly, initiating the polymerization reaction in the presence of air, using active light of low intensity.

Accordingly, an object of the invention is to provide photopolymerizable compositions which can be quickly hardened in the optional presence of air, by the action of active light, without the conventionally practiced addition of wax.

Other objects and advantages of the invention will become apparent from the following description.

As the result of research it has been discovered that a composition which comprises, in combination, a compound containing an ethylenically unsaturated double bond and urethane linkage, with at least one radical or linkage selected from the group consisting of secondary amino radical, tertiary amino radical, and urea linkage, and a photo-polymerization initiator, exhibits a photo-polymerizable property well meeting the object of this invention.

The "combination of a compound containing ethylenically unsaturated double bond and urethane linkage, with at least one radical or linkage selected from the group consisting of secondary amino radical, tertiary amino radical, and urea linkage" signifies.

1. a compound which contains an ethylenically unsaturated double bond and urethane linkage, as well as at least one radical or linkage selected from the group consisting of secondary amino radical, tertiary amino radical, and urea linkage (compound A′), or 2. a mixture of a compound containing an ethylenically unsaturated double bond and urethane linkage (compound A″), with a compound which contains at least one radical or linkage selected from the group consisting of secondary amino radical, tertiary amino radical, and urea linkage (compound B).

Various methods can be conceived for synthesizing the compound (A′), the typical ones being as follows:

1. Reaction of at least one polyisocyanate compound with at least one hydroxy compound containing an ethylenically unsaturated double bond and at least one tertiary amine compound containing a hydroxyl group;

2. Reaction of at least one polyisocyanate compound with a hydroxy compound containing an ethylenically unsaturated double bond, and primary or secondary amine compound;

3. Reaction of the reaction product from at least one epoxy group-containing compound and primary or secondary amine compound, with a polyisocyanate compound and at least one hydroxy compound which contains ethylenically unsaturated double bond; and 4. Reaction of at least one secondary and/or tertiary amine compound containing a hydroxy group, with at least one isocyanate compound containing an ethylenically unsaturated double bond. In those reactions, if necessary, a further saturated monoisocyanate compound, saturated monohydroxy compound, saturated polyhydroxy compound, ethylenically unsaturated carboxylic acid, etc., may be simultaneously reacted.

Specific examples of the polyisocyanate compound to be employed for synthesizing the compound (A′) include: diisocyanate compounds represented by 2,4-tolylene diisocyanate, 2,6-tolylene diisocyanate, p-phenylene diisocyanate, 3,3′-bitolylene-methane-4,4′-diisocyanate, m-phenylene diisocyanate, 4,4′-biphenylene diisocyanate, xylylene diisocyanate, 1,6-hexamethylene diisocyanate, w,w′-dipropylether diisocyanate, octadecylene diisocyanate, 1,4-cyclohexylene diisocyanate, and dicyclohexylmethane-4,4′-diisocyanate, etc.; triisocyanate compounds represented by triphenylmethane-4,4′,4″-triisocyanate and biuret compound of hexamethylene diisocyanate, etc.; and further the polyisocyanate compound, resulting from the reaction of a compound containing active hydrogen atom with polyisocyanate. Those compounds may be used singly or in combination.

As the isocyanate compound containing an ethylenically unsaturated double bond, vinyl isocyanate, isopropenyl isocyanate, allyl isocyanate, bis(2-isocyanataethyl) fumarate, etc. may be named.

As the hydroxy compound containing an ethylenically unsaturated double bond, the following may be named: ethylenically unsaturated mono-hydroxy compounds such as allyl alcohol, 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerin dimethacrylate, trimethylolpropane dimethacrylate, pentaerythritol trimethacrylate, equimolar reaction product of glycidyl methacrylate with an organic acid, 2-bromo-allyl alcohol, 3-chloro-2-hydroxypropyl methacrylate, equimolar reaction product of butyl glycidyl ether with acrylic acid; ethylenically unsaturated poly-hydroxy compounds represented by trimethylolpropane monoacrylate, pentaerythritol diacrylate, pentaerythritol monoacrylate, trimethylolpropane monomethacrylate, pentaerythritol dimethacrylate, pentaerythritol monomethacrylate, reaction product of one mole 4-vinylcyclohexenediepoxide with 2-moles acrylic acid; and further hydroxy compounds containing an ethylenically unsaturated double bond which are obtained through the reaction of a compound selected from the group consisting of later described epoxy group-containing compounds and saturated polyhydroxy compounds specified below, with the later described ethylenically unsaturated carboxylic acids and a saturated polycarboxylic acid; hydroxy group-containing unsaturated polyurethane, hydroxyl group-containing 1,2-polybutadiene resin, etc. The foregoing compounds may be used singly or in combination.

Specific examples of tertiary amine compounds containing the hydroxyl group includes triethanolamine, triisopropanolamine, 2-dimethylaminoethanol, 2-diethylaminoethanol, 2-dipropylaminoethanol, 2-dibutylaminoethanol, 3-dimethylaminopropanol-1, 3-diethylaminopropanol-1, 1-dimethylaminopropanol-2, N-methyl-N,N-diethanolamine, m-chlorophenyldiethanolamine, N-3-methoxypropyl-N,N-diethanolamine, N,N-dibenzyl-N-2-hydroxyethylamine, N-2-hydroxyethyl-N-methylaniline, N-ethyl-N-cyclohexylethanolamine, N-methyl-N-2-hydroxyethyltoluidine, N-ethyl-N-2-hydroxyethyltoluidine, N-2-hydroxyethylpiperidine, N-2-hydroxyethylpipecoline, N-hydroxyethylmorpholine, N,N-dimethylaminotris-hydroxymethyl methane, N-cyclohexyl N,N'-diethanolamine, etc.; polyether type amine compounds formed by addition, to the foregoing amine compounds, of an alkylene oxide such as ethylene or propylene oxide; and hydroxyl group-containing amine compounds (compound X) obtained by reacting the below-specified primary or secondary amine compounds with the later described epoxy group-containing compounds. Those compounds may be used singly or in combination of more than one compound.

As the primary or secondary amine compounds containing active hydrogen from amino radicals, for example, the following may be named: monomethylamine, monoethylamine, mono-n-propylamine, monoisopropylamine, mono-n-butylamine monoisobutylamine, mono-sec.-butylamine, mono-tert.-butylamine, mono-2-ethylhexylamine, monocyclohexylamine, monobenzylamine, aniline, toluidine, 3-methoxypropylamine, 3-aminopropionitrile, p-nitroaniline, o-aminoacetophenone, p-bromoaniline, dimethylamine, diethylamine, di-n-propylamine, diisopropylamine, di-n-butylamine, diisobutylamine, dicyclohexylamine, dibenzylamine, diphenylamine, piperidine, α-pipecoline, N-methylaniline, N-methylcyclohexylamine, N-ethylaniline, N-benzylaniline, N-methylbenzylamine, morpholine, pyrrolidine, ethylenediamine, m-phenylenediamine, 1,2-diaminocyclohexane, benzidine, 4,4'-diaminodiphenylmethane, 4,4'-diaminodiphenylsulfone, 4,4'-diaminodiphenylsulfide, 4,4'-diaminodiphenyloxide, diethylenetriamine, 4,4'-diaminodiphenylamine, 1,4-bis(methylamino) cyclohexane, piperazine, 4,4'-di-(N-monoethylamino) diphenylmethane, N,N-dimethylp-phenylenediamine, dimethylaminopropylamine, diethylaminopropylamine, dibutylaminopropylamine, N-aminopropylmorpholine, N-aminopropyl-2-pipecoline, N-aminoethylpiperazine, N-methylpiperazine, N,N,N'-trimethylethylenediamine, monoethanolamine, monoisopropanolamine, trishydroxymethyl-aminomethane, 2-amino-2-methylpropanol-1, N-hydroxyethylethylenediamine, N-(tert.butyl)-N-hydroxyethylamine, N-phenyl-N-ethanolamine, diethanolamine, and diisopropanolamine. Those compounds may be used singly or in combination of more than one compound.

Again, specific examples of the epoxy group-containing compounds to be reacted with the above primary or secondary amine compounds or later described ethylenically unsaturated carboxylic acids having active hydrogen atoms include: glycidyl acrylate, glycidyl methacrylate, butyl glycidyl ether, phenyl glycidyl ether, allyl glycidyl ether, glycidyl ester of a branched fatty acid which is commercialized by Shell N. V. of Holland under the tradename of "Cardura E", styrene oxide, cyclohexene oxide, octylene oxide, α-pinene oxide, diglycidyl sebacate, diglycidyl maleate, 4-vinylcyclohexene dioxide and epoxy group-containing compounds such as the epoxy resin commercialized by Dainippon Ink and Chemicals Inc. under the tradename of "Epiclon", and epoxynovolak resin. Those compounds may be used singly or in combination of more than one compound.

As the saturated monoisocyanate compound which is optionally used in the synthesis of compound (A') phenylisocyanate, n-butyl-isocyanate, 2-ethylhexylisocyanate, stearylisocyanate, methoxyethylisocyanate, etc. may be named.

Also as the saturated monohydroxy compound which may be used in the synthesis of compound (A'), methanol, ethanol, propanol, octanol, stearyl alcohol, tridecyl alcohol, ethylene glycol monomethylether, ethylene glycol monobutylether, cyclohexyl alcohol, benzyl alcohol, diacetone alcohol, etc. may be named.

As the saturated polyhydroxyl compound, dihydroxy compounds such as ethylene glycol, propylene glycol, 1,4-butylene glycol, 1,6-hexylene glycol and hydrogenated bisphenol A; trihydric or higher order or polyhydroxy compounds such as glycerin, trimethylolpropane, trimethylolethane, pentaerythritol, sorbitol and 1,2,6-hexanetriol; polyether type polyhydroxy compounds such as polypropylene glycol, polyethylene glycol, and polytetramethylene glycol; and saturated polyhydroxy compounds obtained by reacting the aforesaid epoxy groupcontaining compounds and/or above-named saturated polyhydroxy compounds with a saturated carboxylic acid such as 2-ethylhexoic acid, benzoic acid, p-tert.-butylbenzoic acid, vegetable oil fatty acid, adipic acid, sebacic acid, azelaic acid, phthalic acid, isophthalic acid, terephthalic acid, succinic anhydride, phthalic anhydride, and trimellitic anhydride, etc. may be named.

Examples of high molecular weight compounds containing hydroxyl groups which may be used as the polyhydroxy compounds include: polyurethane resin, polyester resin, polyether resin, cellulose and derivatives thereof, partially saponified products of vinyl acetate polymer or copolymer containing hydroxyl groups, polyvinyl alcohol resin, polyvinyl formal resin, polyvinyl butyral resin, 2,2-di(p-hydroxyphenyl) propane type epoxy resin, acrylic resin obtained through copolymerization of ethylenically unsaturated monomer containing hydroxyl group with another ethylenically unsaturated monomer, styrene allyl alcohol copolymer, and alkyd resins, polyester resins, as well as epoxy ester resins which are modified by such monomers which constitute the foregoing various resins.

Also specific examples of the ethylenically unsaturated carboxylic acids optionally employed for introduction of the unsaturated double bond into compound (A') during the synthesis of such compound include: monocarboxylic acids such as acrylic acid, methacrylic acid; polycarboxylic acids such as maleic acid, fumaric acid, citraconic acid, mesaconic acid, itaconic acid, maleic anhydride, itaconic anhydride, chloromaleic acid, and tetrahydrophthalic anhydride.

The compound (A') can be synthesized from the afore-described various compounds, under optional known reaction conditions.

The reaction of isocyanate radical and epoxy radical with active hydrogen atom originating from hydroxyl and amino radicals can be performed under relatively low temperatures (normally ranging from room temperature to 120°C.), in the optional presence of an organic solvent inert to the radicals or a solvent such as an ethylenically unsaturated monomer in the reaction system, to assist the smooth progress of the reaction.

In the above reaction, if an organic solvent is used and must be removed from the reaction product after completion of the reaction, preferably a solvent of low boiling point should be selected. Examples of such organic solvent include: methyl ethyl ketone, methyl isobutyl ketone, ethyl acetate, propyl acetate, butyl acetate, cyclohexyl acetate, tetrahydrofuran, dioxane, diisopropyl ether, diisobutyl ketone, isophorone, cyclohexanone, benzene, toluene, and xylene. These solvents may be used singly or as mixtures.

The ethylenically unsaturated monomer which may be used as the solvent is not critical, as long as it can be hardened integrally with the compound (A') through the process of copolymerization. Specific examples of such monomer include: sytrene, chlorostyrene, a methylstyrene, divinylbenzene, methyl methacrylate, ethyl methacrylate, n-butyl methacrylate, 2-ethylhexyl methacrylate, lauryl methacrylate, tridecyl methacrylate, dimethylaminoethyl methacrylate, diethylaminoethyl methacrylate, ethyl acrylate, isobutyl acrylate, n-butyl acrylate, 2-ethylhexyl acrylate, decyl acrylate, acrylonitrile, ethylene glycol dimethyacrylate, ethylene glycol diacrylate, triethylene glycol dimethacrylate, trimethylolpropane trimethacrylate, diallyl phthalate, diallyl isophthalate, vinyl acetate, vinyl butyrate, allyl methacrylate, and dibutyl fumarate. Those monomers may be used singly or as mixtures of more than one type.

In the various reactions for synthesizing the compound (A'), 0.001 to 1.000% by weight, based on the total amount of the compound or compounds containing ethylenically unsaturated double bond, of a polymerization inhibitor may be present in the reaction system, in order to prevent the polymerization reaction among the ethylenically unsaturated double bonds. Examples of polymerization inhibitors useful for this purpose include: benzoquinone, 2,5-diphenyl-p-benzoquinone, hydroquinone, hydroquinone monomethyl ether, catechol, α-naphthol, mono-tert.-butylhydroquinone and pyrogallol.

The compound (A') which is one of the constituting elements of the subject composition may have the molecular weight varying over a wide range, e.g., from a relatively low molecular weight represented by the chemical formula, i.e. 144

$$CH_2{=}CHNHCOOCH_2N{<}^{CH_3}_{CH_3},$$

to the averate molecular weight as high as approximately 100,000. The molecular weight may be suitably selected according to the intended utility.

For the compound (A') to have a notably high photo-polymerization rate in the presence of air under the action of active light, it is preferred for the compound to contain the urethane linkage which is the main skeletal linkage of such compound, at a ratio of 0.01 to 1.0 per 100 average molecular weight of such compound. Also the total number of the secondary amino radicals, tertiary amino radicals, and urea linkages which are added to the compound preferably ranges from 0.001 to 1.0 per 100 average molecular weight of the compound. Again, the concentration of ethylenically unsaturated double bonds in compound (A') should be appropriate to suit the degree of cross-linkage in the hardened product obtained after the irradiation of subject photo-polymerizable composition with active light, to the intended utility. It is normally preferred for this reason that 0.02 to 1.0 ethylenically unsaturated double bond should be present per 100 average molecular weight of compound (A').

The compound (A'') may likewise by synthesized through various methods, one of the particularly preferred means being to react a polyisocyanate compound with hydroxy compound containing an ethylically unsaturated double bond. If necessary a saturated polyhydroxy compound, saturated monohydroxy compound, ethylenically unsaturated carboxylic acid, etc. may be concurrently present in the above reaction system.

The polyisocyanate compounds, hydroxy compound containing ethylenically unsaturated double bond, saturated polyhydroxy compound, saturated monohydroxy compound, and ethylenically unsaturated carboxylic acid are the same as those useful for the preparation of compound (A').

Still other preferred methods for synthesizing compound (A'') include:

1. Reaction of an isocyanate compound containing an ethylenically unsaturated double bond with a saturated monohydroxy compound, or saturated polyhydroxy compound, or hydroxy compound which contains an ethylically unsaturated double bond, and 2. Reaction of a compound which contains a carboxyl group and urethane linkage with the compound which contains an epoxy group and an ethylenically unsaturated double bond.

The compound containing a carboxyl group and urethane linkage used in the last-mentioned method can be obtained by, for example, reacting a compound containing a carboxyl radical and hydroxyl group with another compound containing an isocyanate group, that is, the reaction between the hydroxyl groups or further a part of the carboxyl groups in the former compound, and the isocyanate groups in the latter compound.

Specific examples of the compound containing both carboxyl groups and hydroxyl groups include glycolic acid, lactic acid, hydroxybutyric acid, and the reaction products from the aforesaid saturated or unsaturated polyhydroxy compounds and/or aforesaid epoxy group-containing compounds, reacted with the aforesaid saturated or unsaturated polycarboxylic acids and/or acid anhydrides thereof.

On the other hand, as some examples of the compounds containing both an epoxy group and ethylenically unsaturated double bond, the following may be named: allyl glycidyl ether, glycidyl acrylate, glycidyl methacrylate, 2-methyl-2,3-epoxypropyl acrylate, 2-methyl-2,3-epoxypropyl methacrylate, bis(2-methyl-2,3-epoxypropyl) tetrahydrophthalate, and diglycidyl maleate, etc.

The synthesis of compound (A'') from the above-named various starting compounds can be performed under optional reaction conditions known per se. For example, the urethanization or esterification reaction for the preparation of compound (A'') can be performed at relatively low temperatures (normally from room temperature to 120°C.). It is of course permissible to use a catalyst to promote smooth progress of the reaction, if such is necessary.

Typical examples of the catalyst to promote the urethanization reaction include known compounds containing tertiary amino groups, tin compounds and titanium compounds. Also among the later-specified compounds belonging to compound (B), those organonitrogen compounds which contain a tertiary amino group but no primary or secondary amino group exhibit not only such conspicuous effect as polymerization promotor for the photo-polymerizable compositions of the subject invention as unknown heretofore, but also the action of a catalyst for the above urethanization reaction. Therefore, such organonitrogen compounds may be added during the preparation of photo-polymerizable compositions of this invention, or during the urethanization reaction.

Examples of the tin compounds include dibutyltin dilaurate, dibutyltin-di-ethyl hexoate, dibutyltin diisooctyl maleate, dibutyltin sulfide, dibutyltin dibutoxide, stannous octoate and stannous oleate. Also as the titanium compounds, for example, dibutyltitanium dichloride, tetrabutyl titanate, and butoxytitanium trichloride, may be named.

Obviously, it is again possible to perform the reaction in the presence of organic solvents which are inert to the various compounds employed for the synthesis of compound (A''), or a solvent such as ethylenically unsaturated monomers. In case such organic solvent is used and must be removed from the reaction product after completion of the reaction, a solvent having a low boiling point should be selected. Examples of such organic solvent include: methyl ethyl ketone, methyl isobutyl ketone, ethyl acetate, propyl acetate, butyl acetate, cyclohexyl acetate, tetrahydrofuran, dioxane, diisopropyl ether, diisobutyl ketone, isophorone, cyclohexanone, benzene, toluene, and xylene. Those solvents may be used singly or as mixtures.

The type of ethylenically unsaturated monomer serving as the solvent is not critical, as long as it can be hardened integrally with the compound (A'') through the process of copolymerization. Examples of useful monomers include styrene, chlorostyrene, α-methylstyrene, divinylbenzene, methyl methacrylate, ethyl methacrylate, n-butyl methacrylate, 2-ethylhexyl methacrylate, lauryl methacrylate, tridecyl methacrylate, ethyl acrylate, isobutyl acrylate, n-butyl-acrylate, 2-ethylhexyl acrylate, decyl acrylate, acrylonitrile, ethylene glycol dimethacrylate, ethylene glycol diacrylate, triethylene glycol dimethacrylate, trimethylolpropane trimethacrylate, diallyl phthalate, diallyl isophthalate, vinyl acetate, vinyl butyrate, allyl methacrylate, and dibutyl fumarate. Those monomers may be used singly or as mixtures of more than one monomer.

Furthermore, if the functional group-containing, ethylenically unsaturated monomers such as the hydroxy compound containing ethylenically unsaturated double bond (e.g., allyl alcohol, 2-hydroxyethyl acrylate, 2-hydroxyethyl methacrylate, 2-hydroxypropyl acrylate, 2-hydroxypropyl methacrylate, etc.); and the ethylenically unsaturated carboxylic acid, which are used in the synthesis of compound (A''), are used in excess of the equivalent of isocyanate radical when reacted with the isocyanate group-containing compound, they remain as unreacted monomers in the reaction system, to serve as the solvent in a manner similar to the above-named ethylenically unsaturated monomers.

In the preparation of compound (A''), 0.001 to 1.000 % by weight, based on the total weight of the compound or compounds containing ethylenically unsaturated double bonds, of a polymerization inhibitor may be present in the reaction system, in order to prevent polymerization among the ethylenically unsaturated double bonds in the compounds used for the reaction. Examples of useful polymerization inhibitor are; benzoquinone, 2,5-diphenyl-p-benzoquinone, hydroquinone, hydroquinone monomethylether, catechol, β-naphthol, mono-tert.-butylhydroquinone, and pyrogallol.

The molecular weight of the compound (A'') is variable over a wide range. For example, the compound of relatively low molecular weight such as represented by the chemical formula, i.e. 101, $CH_2$=$CHNHCOOCH_3$, to such high molecular weight compound having an average molecular weight of approximately 100,000, are all within the scope of compound (A''). They are preferably suitably selected in accordance with the intended final utility.

For the compound (A'') to exhibit the conspicuously high polymerization rate in the presence of air, under the action of active light, it is preferred that the urethane linkage content of the compound should range from 0.01 to 1.0 per 100 average molecular weight of the compound. Again, the preferred concentration of ethylenically unsaturated double bonds in compound (A'') should be such as to suit the degree of crosslinkage in the hardened polymer formed by irradiation of the photo-polymerizable composition of this invention with active light, to the intended utility. Thus, normally it is preferred that the ethylenically unsaturated double bond should be present at a ratio of 0.02 to 1.0 per 100 average molecular weight of compound (A'').

Among compounds (B) used together with compound (A''), i.e., the organonitrogen compounds containing secondary amino groups, tertiary amino groups, or urea linkages, particularly the compounds which achieve one of the objects of this invention — markedly high photo-polymerization rate—with the use of only minor quantities, are those containing the nitrogen atoms constituting secondary or tertiary amino groups at relatively high ratios. Between the compounds of the same nitrogen content, those containing the tertiary amino groups are more effective than those containing secondary amino groups.

Specific examples of this type of organonitrogen compounds belonging to compound (B) include: the compounds which contain tertiary amino groups but no active hydrogen atoms, such as triethylamine, tri-n-propylamine, triisopropylamine, tri-n-butylamine, tri-sec.-butylamine, triisobutylamine, trihexylamine, trioctylamine, tridecylamine, triethyllenediamine, monomethyldibutylamine, dimethylmonocyclohexylamine, dimethylbenzylamine, dimethylaniline, N-methylmorpholine, N-ethylmorpholine, N-methylpiperidine, N-methyl-α-pipecoline, N-methylpyrrolidine, dimethylaminoethyl methacrylate, diethylaminoethyl methacrylate, dimethylaminoethyl acrylate, diethylaminoethyl acrylate, N,N,N',N'-tetramethylethylenediamine and N,N'-dimethylpiperazine; the compounds which contain both tertiary amino groups and alcoholic hydroxyl groups such as triethanolamine, triisopropanolamine, 2-dimethylaminoethanol, 2-diethylaminoethanol, 2-dipropylaminoethanol, 2-dibutylaminoethanol, 3-dimethylaminopropanol-1, 3-diethylaminopropanol-1, 1-dimethylaminopropanol-2, N-methyl-N,N-diethanolamine, m-chlorophenyl-diethanolamine, N-3-methoxypropyl-N,N-diethanolamine, N,N-dibenzyl-N-2-hydroxyethylamine, N-2-hydroxyethyl-N-methylaniline, N-ethyl-N-cyclohexyl-ethanolamine,N-methyl-N-2-hydroxyethyltoluidine, N-ethyl-N-2hydroxyethyltoluidine, N-2-hydroxyethylpiperidine, N-2-hydroxyethyl-α-pipecoline, N-hydroxyethylmorpholine, N,N-dimethylamino-trishydroxymethylmethane N-cyclohexyl-N,N-diethanolamine; the compounds which contain tertiary amino groups as well as secondary and/or primary amino groups such as dimethylaminopropylamine, diethylaminopropylamine, dibutylaminopropylamine, N-aminoethylmorpholine, N-aminopropyl-2-pipecoline, N-aminoethylpiperazine, N-methylpiperazine, N,N,N'-trimethylethylenediamine, and N,N-dimethylethylenediamine; the compounds which contain secondary amino groups, such as diethylamine, di-n-propylamine, diisopropylamine, di-n-butylamine, diisobutylamine, dicyclohexylamine, dibenzylamine, piperidine, α-pipecoline, N-methylaniline, N-ethylaniline, N-methylcyclohexylamine, N-benzylaniline, N-methylbenzylamine, morpholine, pyrrolidine, piperazine, N-(tert.-butyl)-N-hydroxyethylamine, N-phenyl-N-ethanolamine, diethanolamine, diisopropanolamine and N-hydroxyethylethylenediamine; the aforesaid compound (X); the amine compounds containing ether linkages which are obtained by adding alkylene oxide such as ethylene or propylene oxide, to the compounds having both a tertiary amino group and active hydrogen atom (e.g., primary and secondary amino groups, alcoholic or phenolic hydroxyl group, carboxyl group, mercapto group, etc.); and the compounds containing a tertiary amino group and urethane linkage which are obtained through the reaction of compounds containing a tertiary amino group and alcoholic hydroxyl group, with the aforesaid mono-or poly-isocyanate compounds. The foregoing compounds can be used singly, or in combination of plural compounds.

Among the compounds belonging to the scope of compound (B), the following may be named as the organonitrogen compounds containing urea linkages: the reaction products of the aforesaid primary or secondary amine compounds employed for the synthesis of compound (A') with those saturated monoisocyanate compounds, saturated polyisocyanate compounds, or isocyanate compounds containing ethylenically unsaturated double bond, which are also useful in the synthesis of compound (A') as already described.

For the photo-polymerizable compositions of the invention composed of compounds (A'') and (B) to exhibit the high polymerization rate as intended in this invention, preferably compound (B) is used in such a quantitative ratio that, when it is a compound or compounds containing secondary and/or tertiary amino groups, the weight of the total nitrogen atoms constituting the secondary and/or tertiary amino groups is at least 0.01 part per 100 parts by weight of compound (A''). Also when compound (B) is a compound or compounds containing urea linkages, preferably the weight of the total nitrogen atoms constituting the urea linkages should be at leat 0.03 part per 100 parts by weight of compound (A'').

As already defined, the photo-polymerizable compositions of the present invention are composed essentially of the compound containing an ethylenically unsaturated double bond and urethane linkage, in combination with at least one radical or linkage selected from the group consisting of a secondary amino radical, tertiary amino radical, and urea linkage, and photo-polymerization initiator. Furthermore the compositions may contain, as occasion demands, already specified ethylenically unsaturated monomers, the below-specified high molecular weight compounds, known plasticizers, modifiers of rheological characteristics, coloring agents such as pigments and dyestuffs, fillers, solvents, etc.

The photo-polymerization initiator serves to facilitate the initiation of photo-polymerization reaction by photo-excitation, when the compositions of this invention are irradiated. As the initiator, for example, those disclosed in Chemical Reviews, Vol. 68, No. 2, pp. 125 – 151 (pub. Mar. 25, 1968) can be used. The most typical initiators include: acyloin and derivatives thereof, such as benzoin, benzoin methyl ether, benzoin ethyl ether, benzoin isopropyl ether, benzoin isobutyl ether, desyl bromide, and α-methylbenzoin; diketones such as benzil and diacetyl, etc.; organic sulfides such as diphenyl monosulfide, diphenyl disulfide, desyl phenyl sulfide, and tetramethylthiuram monosulfide; S-acyl ditiocarbamates, such as S-benzoyl-N,N-dimethyldithiocarbamate and S-(p-chlorobenzoyl)-N,N-dimethyldithiocarbamate; phenones such as acetophenone, α,α,α-tribromacetophenone, o-nitro-α,α,α-tribromoacetophenone, benzophenone, and p,p'-tetramethyldiaminobenzophenone; sulfonyl halides such as p-toluenesulfonyl chloride, 1-naphthalenesulfonyl chloride, 2-naphthalenesulfonyl chloride, 1,3benzenedisulfonyl chloride, 2,4-dinitrobenzenesulfonyl bromide, and p-acetamidebenzenesulfonyl chloride; and inorganic salts such as uranyl nitrate, silver bromide, stannic chloride, stannous chloride, and ferric rhodanate. Those photo-polymerization initiators may be used singly or as mixtures. Normally the initiator is used in quantities ranging from 0.001 to 10% by weight based on the total weight of the photo-polymerizable composition of the present invention. When the quantity is less than 0.001 % by weight, the photo-polymerization rate becomes extremely low. If the initiator is used in excess of 10 % by weight, no correspondingly improved effect can be expected. Thus addition of such greater quantity is economically unjustified.

As the ethylenically unsaturated monomers which may be present in the compositions, those various ethylenically unsaturated monomers employable as the solvent, those functional group-containing, ethylenically unsaturated monomers useful in the synthesis of compound (A') or (A'') (e.g., the compounds containing functional groups such as hydroxyl, carboxyl, epoxy and carboamide groups, as well as ethylenically unsaturated double bond) may be used. Specific examples of such monomers are as follows : 2-hydroxyethyl acrylate, 2-hydroxyethyl methacrylate, 2-hydroxypropyl acrylate, 2-hydroxypropyl methacrylate, 3-chloro-2-hydroxypropyl methacrylate, diethylene glycol monoacrylate, diethylene glycol monomethacrylate, glycerine dimethacrylate, trimethylolpropane dimethacrylate, trimethylolpropane monomethacrylate, trimethylolethane monoacrylate, allyl alcohol, 2-bromoallyl alcohol, N-hydroxymethyl acrylamide, N-hydroxymethyl methacrylamide, acrylic acid, methacrylic acid, maleic acid, fumaric acid, maleamic acid, glycidyl methacrylate, glycidyl acrylate, allyl glycidyl ether, bis-(2-methyl-2,3-epoxypropyl) tetrahydrophthalate, acrylamide, methacrylamide, and N-methylacrylamide. It is desirable that such ethylenically unsaturated occupies no more than 80% of the total weight of the photo-polymerizable composition of the present invention, and still more preferably, no more than 60% by weight. Use of such monomer or monomers in greater quantitative ratios than the above recommended is undesirable, because occasionally the hardening rate of the composition is retarded, or the hardened product may have reduced mechanical strength and chemical resistance, etc.

Also as the aforesaid high molecular weight compounds, besides the already enumerated high molecular weight compounds containing hydroxyl groups, polyethylene, polymethyl methacrylate, polyethyl acrylate, polystyrol, polyvinyl chloride, styrene-butadiene copolymer, polybutadiene, natural rubber, natural fat and oil, synthetic drying oil, polyvinyl acetate, cellulose acetate, polyvinyl pyrrolidone, polyamide resin, polyurethane resin, wax, etc., can be used.

Those high molecular weight compounds can be used as optionally desired, for such purposes as reduction of the cost of preparation of the subject compositions, improvement in painting property, coating property, etc. of the composition when it is used as a painting material.

Again, as the plasticizers, dioctyl phthalate, dibutyl phthalate, butyl phthalylbutyl glycolate, polyester or polyepoxy type plasticizer sold under the tradename "Admex" (produced by Ashland Chemical Co., U.S.A.), tricresyl phosphate, and chlorinated paraffin, etc., may be named.

Useful fillers include: glass fiber, powdered silica, barytes or calcium carbonate, etc.

As the solvent, besides the various compound enumerated as the useful solvent in the reactions for synthesis of compounds (A') and (A''), known solvents used for diluting this type of photo-polymerizable composition, such as alcohols containing no ethylenically unsaturated double bond, e.g., methyl alcohol, ethyl alcohol, octyl alcohol, cyclohexyl alcohol and ethylene glycol monomethyl ether, etc., can be used.

The photo-polymerizable compositions of the invention composed as above can be readily polymerized in the optional presence of air, under the irradiation of active light of the wavelengths ranging from 1,800 to 7,000 A. As the source of such active light, a carbon-arc lamp, mercury vapour lamp, ultraviolet fluorescent lamp, tungstem lamp, incandescent lamp, xenone lamp, argon globe lamp, illumination lamp for photographic use, and sunlight, etc. may be used. The photo-polymerizable compositions of the invention are photochemically cross-linked under the irradiation of such active light, to form photo-hardened products which are insoluble in organic solvents.

Thus the compositions of this invention have wide varieties of utilities with great advantage, for example, formation of photographic images, preparation of printing plates, preparation of name plates, coating of various materials such as glass, plastics, paper, metal, stone, wood, etc., preparation of printed matters, manufacture of printed circuit boards, laminates, impregnated products, and plastic shaped articles, etc.

Hereinafter the invention will be further explained with reference to working examples, which are not to be construed as limitative to the scope of this invention. In the Examples, parts, percents, and mixing ratios are all by weight, unless otherwise specified.

EXAMPLES 1 –5

A reactor equipped with a stirrer was charged with 174 parts of 2,4-tolylene diisocyanate, 150 parts of ethyl acrylate, and 0.14 part of p-benzoquinone, and heated to 70°C. At such temperature 130 parts of 2-hydroxyethyl methacrylate were dropped into the reactor, consuming an hour. Through the following 2 hours reaction, a ethyl acrylate solution of chiefly $\beta$-methacryloxyethyl-3-isocyanate-4-methyl-phenyl-carbamate was obtained. In each run this ethyl acrylate solution was mixed with an amine compound specified in Table 1 at room temperature. The temperature rise due to the reaction heat was prevented by forced cooling, to maintain the reaction temperature at 70°C. for 2 hours. Thus, light yellow and transparent ethyl acrylate solutions of compound (A') were obtained. In each 100 parts of the solution, 1 part each of benzoin methyl ether and benzophenone were homogeneously dissolved, to form the photo-polymerizable composition.

The photo-polymerizable composition was daubed on a glass sheet to a thickness of 100 microns, and the daubed surface was irradiated with the active light supplied by a 2 KW high pressure mercury lamp (product of Philips N. V., Holland, Model HTQ-7, length of emitting portion: 750 mm) in air. The distance between the emitter and the glass sheet was 15 cm. The time required for the formation of hardened film on the glass sheet was as given in Table 1.

Table 1

| Ex. No. | Amine Compound | | Hardening Time * |
|---|---|---|---|
| 1 | Triethanolamine | 149 parts | 1.0 sec. |
| 2 | N-methyl-N,N-diethanolamine | 119 parts | 1.0 sec. |
| 3 | Dimethylaminoethanol | 89 parts | 1.5 sec. |
| 4 | m-Chlorophenyldiethanolamine | 216 parts | 1.5 sec. |
| 5 | Di-n-butylamine | 129 parts | 1.5 sec. |

* "Hardening time" refers to the irradiation time required for the hardening to progress to such a degree that the film on the glass is no longer imprintable with the finger, and the coated glass can be piled up one on another, and can be polished. This definition applies to the same term throughout the following Examples.

For comparison, the procedures in the foregoing Examples were repeated except that no amine compound was added. The hardening time required was 120 seconds.

From the foregoing results, it was confirmed that the compositions of this invention are excellent in that their photo-polymerization rate in the presence of air is greatly accelerated.

EXAMPLE 6

A reactor equipped with a stirrer was charged with 522 parts of tolylene diisocyanate (2,4-tolylene diisocyanate/2,6-tolylene diisocyanate = 80/20) 220 parts of ethyl acetate, 0.8 part of tri-n-butyl-amine (as the catalyst for urethanization reaction), and 0.35 part of p-benzoquinone and heated to 70°C. While the system was maintained at such temperature, 134 parts of trimethylolpropane which has been heated to 80°C. and melted in advance were dropped thereinto, consuming 2 hours. The reaction was continued for an additional 2 hours, and an ethyl acetate solution of trimethylolpropane triurethane was obtained. Then 500 parts of ethyl acrylate were added to the solution. While the mixture was maintained at 70°C., 232 parts of 2-hydroxyethyl acrylate were dropped thereinto, consuming an hour. After subsequent 4 hours reaction, the system was cooled to room temperature, and 149 parts of triethanolamine, were added which required 30 minutes. The reaction was continued for a further 2 hours at 70°C., to produce a light yellow, transparent ethyl acrylate/ethyl acetate solution of compound (A'). In 95 parts of this solution, 5 parts of 2-hydroxyethyl methacrylate, 1.0 part of benzoin methyl ether, and 1.0 part of benzophenone, were homogeneously dissolved, to form a photo-polymerizable composition in accordance with the present invention.

The composition was used as a coating material as in Examples 1 -5, and similarly irradiated. A completely hardened coating was formed after the irradiation of 1.5 seconds.

EXAMPLES 7 -9

With the ethyl acrylate/ethyl acetate solution of compound (A') as obtained in Example 6, in the amount varied for each run as specified in Table 2, a prepolymer solution synthesized as below, β-hydroxyethyl methacrylate, benzoin methyl ether and benzophenone in the amounts each specified also in Table 2, were blended, to form photo-polymerizable compositions.

The synthesis of above prepolymer was performed as follows:

A reactor was charged with 522 parts of tolylene diisocyanate (2,4-/2,6-tolylene diisocyanate = 80/20), 220 parts of ethyl acetate, 0.8 part of tri-n-butylamine as an urethanization catalyst, and 0.35 part of p-benzoquinone, and heated to 70°C. While the system was maintained at such temperature, 134 parts of trimethylolpropane which had been heated and melted at 80°C. in advance were dropped thereinto, consuming 2 hours. After the subsequent 2 hours reaction, an ethyl acetate solution of trimethylolpropane triurethane was obtained. To the solution 500 parts of ethyl acrylate were added, and the temperature of the resulting solution was adjusted to 70°C. 348 Parts of 2-hydroxyethyl acrylate were dropped into the solution, consuming an hour. The reaction was continued for 4 hours, more and a light yellow, transparent ethyl acrylate/ethyl acetate solution of the prepolymer was obtained.

The hardening time of this photo-polymerizable composition was measured in the manner similar to Examples 1 - 5, with the results as shown in Table 2.

Table 2

| Example No. | Compound (A') solution (part) | Prepolymer solution (part) | β-hydroxyethyl methacrylate (part) | Benzoin methyl ether and benzophenone (part) | Hardening time (sec.) |
|---|---|---|---|---|---|
| 7 | 70 | 25 | 5 | 1 each | 1.5 |
| 8 | 45 | 50 | 5 | 1 each | 1.5 |
| 9 | 20 | 75 | 5 | 1 each | 1.5 |

EXAMPLE 10

A reactor equipped with a stirrer was charged with 522 parts of tolylene diisocyanate (2,4-/2,6-tolylene diisocyanate = 80/20), 500 parts of methyl methacrylate, 0.35 part of p-benzoquinone, and 0.8 part of tri-n-butylamine, and the system was maintained at 70°C. Into the reactor 134 parts of trimethylolpropane which had been heated and melted at 80°C. were dropped, consuming 2 hours, and the reaction was continued for 2 more hours, to form a methyl methacrylate solution of isocyanate compound. Into the solution 260 parts of 2-hydroxyethyl methacrylate were dropped, consuming an hour, at the reaction temperature of 70°C., followed by 4 more hours reaction. Thus a light yellow, transparent methyl methacrylate solution of 2-hydroxyethyl methacrylate-modified isocyanate compound containing 2.9 % of isocyanate radicals was obtained. Into the solution, 87 parts of morpholine were dropped at 70°C., consuming an hour. Upon a subsequent 30 minutes reaction, a dark red, transparent methyl methacrylate solution of compound (A') was obtained. To 100 parts of this solution, 1.1 parts each of benzoin methyl ether and benzophenone were added and dissolved homogeneously, to form a photo-polymerizable composition.

The composition was daubed on a piece of glass sheet to a thickness of 100 microns, and irradiated with the active light from a high pressure mercury lamp (product of Ushio Denki Co. output: 1.5 KW, length of emission part: 650 mm) in air, at a distance of 15 cm. The hardening time of the coating was 10 seconds.

For comparison, the foregoing procedures were repeated except that the addition of morpholine was omitted. The hardening time of the resulting composition was 60 seconds. From the above results, it is confirmed that the subject composition is excellent in that the photo-polymerization rate in the presence of air is markedly accelerated.

EXAMPLE 11

To an unsaturated polyester having an acid value of 1.5 which had been synthesized from 98 parts of maleic anhydride and 122 parts of 1,2 propylene glycol according to the accepted practice, 150 parts of styrene, 0.05 part of p-benzoquinone, and 75 parts of methyl ethyl ketone were added, and stirred into a homogeneous solution. Into the solution 100 parts of tolylene diisocyanate (2,4-/2,6-tolylene diisocyanate = 80/20) were added at room temperature, and reacted for 2.5 hours at the temperatures not exceeding 70°C. At such temperature, 83.5 parts of di-n-butylamine were dropped into the system consuming 30 minutes, followed by a further 30 minutes reaction. Thus a light yellow, transparent styrene/methyl ethyl ketone solution of compound (A') was obtained. In 100 parts of this solution, 1.0 part of benzoin methyl ether and 1.0 part of benzophenone were dissolved homogeneously, to form a light yellow, transparent photo-polymerizable composition.

The hardening time of this composition was measured in the manner similar to Examples 1 – 5, which was 13 seconds.

EXAMPLE 12

A reactor equipped with a stirrer was charged with 348 parts of tolylene diisocyanate (2,4-/2,6-tolylene diisocyanate = 80/20), 150 parts of ethyl acetate, 0.8 part of tri-n-butylamine, and 0.23 part of p-benzoquinone, and heated to 70°C. While the system was maintained at such temperature, 135 parts of 1,3-butylene glycol were dropped thereinto, consuming an hour. After the subsequent 3 hours reaction, a mixture of 58 parts of 2-hydroxyethyl acrylate and 66 parts of N-hydroxyethyl morpholine was dropped into the system at 70°C., consuming an hour, followed by an additional 4 hours reaction. Into the system 320 parts of ethyl acrylate were added and dissolved homogeneously, to form a light yellow, transparent ethyl acrylate/ethyl acetate solution of compound (A').

The foregoing procedures were repeated except that the 66 parts of N-hydroxyethyl morpholine were replaced by 80 parts of 3-chloro-2-hydroxypropyl methacrylate. Thus a light yellow, transparent prepolymer solution was obtained.

To a mixture of 50 parts of this prepolymer solution with 50 parts of the previously obtained solution of compound (A'), 1.5 parts of benzoin methyl ether was added and dissolved homogeneously, to form a photo-polymerizable composition in accordance with the invention. The hardening time of the composition measured similarly to Examples 1 – 5 was only 5 seconds.

EXAMPLE 13

A reactor was charged with 169 parts of xylylene diisocyanate (m-/p-xylylene diisocyanate = 70 — 75/30 — 25), 70 parts of ethyl acetate, 0.1 part of tri-n-butylamine and 0.08 part of p-benzoquinone, and the system was heated to 70°C. After dropping 36.6 parts of 1,2,6-hexanetriol into the system consuming an hour, the system was allowed to react for 3 hours, and then 69.6 parts of 2-hydroxyethyl acrylate were dropped in at 70°C., consuming an hour. After the subsequent 4 hours reaction, the system was cooled to room temperature, and 26.7 parts of N,N-dimethylethanolamine were added, to be reacted for the subsequent 2 hours, while the reaction temperature was controlled not to exceed 70°C. Then 50 parts of methyl alcohol were added to the reaction system, to form a dark red, transparent ethyl acetate/methyl alcohol solution of compound (A'). In 100 parts of this solution, 1.0 part each of benzoin isopropyl ether and benzophenone was dissolved homogeneously to form a photo-polymerizable composition. The hardening time of the composition measured similarly to Examples 1 – 5 was 2.0 seconds.

EXAMPLE 14

A reactor was charged with 696 parts of tolylene diisocyanate (2,4-/2,6-tolylene diisocyanate = 80/20), 496 parts of ethyl acrylate, and 0.464 part of p-benzoquinone, and heated to 70°C. While the temperature was maintained at 70°C., 464 parts of 2-hydroxyethyl acrylate were dropped into the system, consuming 2 hours, and the reaction was effected for an additional 4 hours to yield an isocyanate solution.

Another reactor was charged with 355 parts of "Epikote 828" (product of Shell International Chemicals Corp. of Holland, a bisphenol type epoxy resin), 233 parts of ethyl acrylate, and 0.54 part of hydroquinone, and heated to 80°C. While the temperature was maintained at 80°C. and nitrogen gas was blown into the system, 186 parts of aniline were added, consuming 30 minutes. After the subsequent 9 hours reaction, 106 parts of ethyl acrylate, and then 251 parts of glycidyl methacrylate, were added to the system, the latter addition requiring 15 minutes. The reaction was further continued for 15 hours, and the system was cooled to 70°C. and 829 parts of previously obtained isocyanate solution were added together with 2.0 parts of tri-n-butylamine, which required 1 hour. Upon subsequent 6 hours reaction, a light yellow, transparent solution of compound (A') was obtained. Into 100 parts of this solution, 2 parts of benzophenone were mixed thoroughly and dissolved, to form a homogeneous photo-polymerizable composition.

The composition was completely hardened after 4 seconds irradiation of active light similarly to Examples 1 – 5, when daubed onto a piece of glass sheet.

EXAMPLE 15

A reactor was charged with 522 parts of tolylene diisocyanate (2,4-/2,6-tolylene diisocyanate = 80/20), 370 parts of n-butyl acrylate, and 0.83 part of tri-n-butylamine as urethanization catalyst, and heated to 50°C. At such temperature 134 parts of solid trimethylolpropane were added to the system in 3 quotients, at 1 hour intervals. After a subsequent 2 hours reaction, 0.70 part of p-benzoquinone was added, and thereafter 458 parts of 2-hydroxyethyl acrylate were dropped into the system, consuming 3 hours. The reaction temperature was raised to 70°C. during the following 4 hours reaction. Thus a light yellow, transparent urethane solution was obtained.

Separately, the procedures of Example 6 were repeated except that 149 parts of triethanolamine were replaced by 73 parts of mono-n-butylamine, and the ethyl acetate was replaced by ethyl acrylate, to form an ethyl acrylate solution of compound (A').

Then 68 parts of the ethyl acrylate solution were mixed thoroughly with a solution composed of 2 parts of "Polyvinylpyrrolidone K-30" (product of General Aniline & Film Co., U.S.A.) and 30 parts of first-obtained urethane solution, and 1.5 parts of benzoin methyl ether, to form a homogeneous photo-polymerizable composition.

The composition was daubed onto plural sheets of polyethylene terephthalate film, which were then adhered with one another. Upon irradiating the same with an active light from a 2 KW high pressure mercury lamp, at a distance of 30 cm, for a minute, a strongly adhered film laminate was obtained.

EXAMPLE 16

A reactor was charged with 376 parts of xylylene diisocyanate (m-/p-xylylene diisocyanate = 70 — 75/30 — 25), 336 parts of ethyl acrylate, and 0.28 part of p-benzoquinone, and heated to maintain the temperature at 70°C. To the system 338 parts of diphenylamine which had been pre-heated to 70°C. were dropped, consuming 30 minutes. The system was further reacted for 3 hours, to form a urethane solution.

Separately, a reactor was charged with 200 parts of "Epikote 828", 66 parts of crotonic acid, 3 parts of zinc octoate as an esterification catalyst, and 0.1 part of 2,5-diphenyl-p-benzoquinone, and the system was reacted for 10 hours at 130°C., and thereafter cooled to 70°C. While the system was maintained at 70°C., 525 parts of first-obtained urethane solution which had been pre-heated to 50°C. were dropped thereinto, consuming an hour, followed by 4 hours reaction. Upon subsequent addition of 80 parts of ethylene glycol dimethacrylate to the system, a brown solution of compound (A') was obtained.

25 Parts of this solution were well mixed with 1.0 part of benzoin methyl ether and 26 parts of the composition obtained in Example 9, forming a homogeneous solution. A photo-polymerizable composition was prepared, by mixing this solution with 45 parts of talc of 80 microns in average grain size, 5 parts of "Aerosyl 2491" (product of DEGUSSA, West Germany) and 15 parts of methyl isobutyl ketone, by means of a dispersing stirrer for 15 minutes.

The composition was daubed onto a piece of plywood to a thickness of approximately 130 microns, with a bar coater, and allowed to stand for a minute at normal temperature. Upon irradiation of this daubed surface with an active light from a 2 KW high pressure mercury lamp in air for a minute, a hardened coating film suited for a wood sealer was obtained.

EXAMPLE 17

A reactor was charged with 86 parts of methacrylic acid and 0.45 part of 2,5-diphenyl-p-benzoquinone, and while the system was maintained at 100°C., 142 parts of glycidyl methacrylate were dropped thereinto, consuming 2 hours. After the subsequent reaction for 13 hours, a methacrylate intermediate product composed chiefly of glycerin dimethacrylate of an acid value of 9.0 was obtained.

Separately, a reactor was charged with 76.4 parts of "Desmodur N-75" (ethyl acetate/xylol solution containing 75 % of polyfunctional isocyanate component), and maintained at 70°C. Into the latter 22.8 parts of first-obtained methacrylate intermediate product were dropped, consuming 2 hours, followed by 3 hours reaction and cooling to 60°C. Thereafter 12.9 parts of di-n-butylamine were dropped into the system consuming an hour, followed by 30 minutes reaction. Upon addition of 47.9 parts of n-butyl acrylate, a light yellowish brown, transparent solution of compound (A') was obtained. The isocyanate content of the solution was 3.0 %. In 95 parts of this solution, 5 parts of dibutyl phthalate, 1.0 part of benzoin methyl ether, 0.5 part of benzophenone, and 0.5 part of n-butyl acrylate solution containing 1.0 % "Silicone No. 1 Paint Additive" (product of Dow Corning Corp., U.S.A.) were homogeneously dissolved to form a photo-polymerizable composition.

The composition was daubed onto floor board (wooden material) to a thickness of 100 microns, with a bar coater, and allowed to stand for 1 minute at room temperature. Thereafter the daubed surface was irradiated with active light from a 2 KW high pressure mercury lamp in air, at the irradiation distance of 20 cm for 10 seconds. As a result a lusterous, hard coating was formed on the board.

EXAMPLE 18

A reactor was charged with 522 parts of tolylene diisocyanate (2,4-/2,6-tolyene diisocyanate = 80/20), and heated to 70°C. While the temperature was controlled not to exceed 70°C., 2600 parts of "Polyglycol 15 - 200" (polyether polyol commercialized by Dow Chemicals Inc., U.S.A., average molecular weight : approx. 2600) were dropped into the reactor, consuming an hour, followed by a further 5 hours reaction. Thereafter 500 parts of ethyl acrylate, 286 parts of 2-hydroxyethyl methacrylate, and 1.2 parts of p-banzoquinone, as a homogeneous liquid mixture, were dropped into the system, which required 30 minutes. After a subsequent 4 hours reaction, the system was cooled to 50°C., and 181 parts of dicyclohexylamine were dropped, in consuming 30 minutes. The system was again heated to 70°C., and allowed to react for 2 hours. Thereafter 374 parts of 2-hydroxyethyl methacrylate and 100 parts of 2 -hydroxyethyl acrylate were added to the system, to provide a brown and transparent solution of compound (A'). In 100 parts of this composition, 1.5 parts of benzoin methyl ether was homogeneously dissolved, to form a photo-polymerizable composition.

The composition was poured onto a piece of 6-mm thick polished sheet glass (a) on which rubber spacers were so disposed that a 3-mm thick hardened resin layer would be formed on the glass. Further on the glass surface, the following layers were superposed by the order stated: 12-microns thick polyethylene terephthalate film, negative film, and the above sheet glass (b). Then the resulting laminated structure sandwiched between two sheets of glass was irradiated with an active light from high pressure mercury lames (800 W) at the two glass surfaces, at a distance of 35 cm each. The glass (a) surface was irradiated for 3 minutes, and glass (b) surface, 12 minutes. After exposure, the polyethylene terephthalate film was peeled off from the photo-hardened layer which was subsequently developed with 25°C. 0.5 % aqueous sodium carbonate. Thus a rubbery elastomer with clear relief images, i.e., flexo printing plate was obtained. Then for reinforcing purpose, the plate was further exposed to sunlight in air under very fine weather, at a right angle to the surface to be irradiated, for an hour. The resulting product had a Shore hardness (A) of 65.

EXAMPLE 19

A reactor was charged with 522 parts of tolylene diisocyanate (2,4-/2,6-tolylene diisocyanate = 80/20), and 224 parts of ethyl acetate. While the content was heated and maintained at 45°C., 149 parts of triethanolamine were dropped thereinto, consuming 2 hours. Then the temperature was gradually raised to 50°C., while the reaction was continued for 2 hours. At the temperature of 50°C., a mixture composed of 130 parts of 2-ethylhexyl alcohol, 232 parts of 2-hydroxyethyl acrylate, and 0.3 part of p-benzoquinone was dropped into the system, consuming 1 hour. After a subsequent 4 hours reaction, 315 parts of ethylene glycol dimethacrylate were added to the system, to form a brown and transparent ethyl acetate/ethylene glycol dimethacrylate solution of compound (A'). To 80 parts of this solution, 20 parts of "Brilliant Carmine 6B" as a pigment, 5 parts of benzoin methyl ether, and 5 parts of benzophenone were added. A part of the ethyl acetate was evaporated, and in the meantime the remaining system was well kneaded with 3-rod test rolls, to provide a photo-polymerizable composition.

The composition was extended, and spread on a piece of high quality paper with a spatula. Then the irradiation procedures practiced in Examples 1 through 5 were repeated, except that the irradiation time was 20 seconds. A completely hardened coating was formed on the paper.

EXAMPLE 20

To 87.7 parts of the ethyl acetate solution of trimethylolpropanetriurethane synthesized in Example 6, 4.1 parts of ethyl acetate were added, and together charged into a reactor. While the reactor content were maintained at 70°C. under heating, 17.4 parts of 2-hydroxythyl acrylate was dropped thereinto, consuming 30 minutes, followed by 3 hours reaction. Further 45.0 parts of ethyl acetate were added to the system, and the reaction temperature was lowered to 50°C. Some 11.0 parts of mono-n-butylamine were dropped into the system, which required 15 minutes. After a subsequent 1 hour reaction at 70°C., an ethyl acetate solution of compound (A') was obtained. A photo-polymerizable composition was prepared therefrom, to homogeneously dissolving 1.0 part each of benzoin methyl ether and benzophenone in 100 parts of above solution of compound (A').

The composition was daubed onto a sheet of tin plate to a thickness of 100 microns, and irradiated with an active light from a 5 KW high pressure mercury lamp in air, at the irradiation distance of 30 cm. The resulting hardening time was 5 seconds.

EXAMPLE 21

A reactor was charged with 188 parts of xylylene diisocyanate (m-/p-xylylene diisocyanate = 70 — 75/30 — 25), 130 parts of ethyl acrylate, and 0.12 part of p-benzoquinone, and while the content was maintained at 70°C. under heating, 116 parts of 2-hydroxyethyl acrylate were dropped thereinto, consuming an hour. Thereafter the reaction was continued for 3 hours, to yield an isocyanate solution.

Then 43.4 parts of this isocyanate solution were charged into a reactor together with 4.5 parts of ethyl acrylate, and into which 10.5 parts of diethanolamine were dropped at room temperature, which required 15 minutes. Subsequently the system was allowed to react for 30 minutes at 70°C., yielding an ethyl acrylate solution of compound (A').

A photo-polymerizable composition was prepared by homogeneously dissolving 1 part of benzophenone in 50 parts of the above solution.

The composition was used as a coating material as in Example 20. The hardening time required was 1.0 second.

EXAMPLE 22

To a mixture of 65.1 parts of the isocyanate solution obtained in Example 21 with 2.3 parts of ethyl acrylate, 5.3 parts of diethanolamine were dropped at room temperature, consuming 15 minutes. Then the system was heated to 70°C. and reacted for 30 minutes. Thus an ethyl acrylate solution of compound (A') was obtained. In 50 parts of this solution, 1.0 part of benzophenone was homogeneously dissolved to form a photo-polymerizable composition.

The composition was used as a coating material as in Example 20. The measured hardening time was 3.0 seconds.

EXAMPLE 23

To a mixture of 43.4 parts of the isocyanate solution obtained in Example 21 with 3.9 parts of ethyl acrylate, 8.7 parts of morpholine were dropped at room temperature, which required 15 minutes. The system was then reacted for 30 minutes at 70°C., to provide an ethyl acrylate solution of compound (A').

To 50 parts of this solution, 1.0 part of benzophenone was added and homogeneously dissolved, to form a photo-polymerizable composition. The hardening time of the composition was measured similarly to Example 20, with the excellent result of 1.0 second.

EXAMPLE 24

A reactor equipped with a stirrer was charged with 174 parts of tolylene diisocyanate (2,4-/2,6-tolylene diisocyanate = 80/20), 124 parts of ethyl acrylate, and 0.12 part of p-benzoquinone. While the reactor content was heated and maintained at 70°C., 116 parts of 2-hydroxyethyl acrylate were dropped thereinto, which required 2 hours. Upon a subsequent 4 hours reaction, an isocyanate solution was obtained.

Separately, another reactor was charged with 20.4 parts of monoethanolamine and 33.7 parts of ethyl acrylate, and into which 276 parts of the first-obtained isocyanate solution were dropped, consuming 3 hours, while the system was maintained at 50°C. under heating. Thereafter the system was allowed to react for 2 hours, to provide an ethyl acrylate solution of compound (A').

Forty (40) parts of this solution were mixed with 40 parts of the ethyl acetate solution of compound (A') as prepared in Example 20, 20 parts of ethyl acrylate, 1.0 part of benzoin methyl ether, and 1.0 part of benzophenone, to provide a photo-polymerizable composition as a homogeneous solution.

The hardening time of the composition measured in the manner similar to Example 20 was 3.0 seconds.

EXAMPLES 25 - 45

A reactor equipped with a stirrer was charged with 522 parts of tolylene diisocyanate (2,4-/2,6-tolylene diisocyanate = 80/20), 444 parts of ethyl acrylate, 0.35 part of p-benzoquinone, and 0.8 part of dibutyltin dilaurate as an urethanization catalyst. While the system was heated and maintained at 50°C., 134 parts of solid trimethylolpropane were added thereto as three quotients at 1-hour intervals. Thereafter, the system was allowed to react for 2 hours, and into which 350 parts of 2-hydroxyethyl acrylate were dropped, which required 2.5 hours. After a subsequent 9 hours reaction, a light yellow, transparent ethyl acrylate solution of compound (A'') was obtained.

Photo-polymerizable compositions were prepared, by homogeneously mixing 300 parts of the above solution, 3 parts of benzoin methyl ether, 3 parts of benzophenone, and compound (B) varied for each run, in the amount specified in Table 3.

Each of the compositions was daubed onto a glass sheet to a thickness of 100 microns, and irradiated with an active light from a high pressure mercury lamp (manufactured by Kinmon Seisakujo, Ltd., output: 5.0 KW, length of emitting part: 450 mm, double tube) in air, at an irradiation distance of 30 cm. The hardening time thus measured was as given in Table 3.

Also for comparison, the results of Control runs performed similarly to the above, except that compound (B) was omitted (Control 1), and that compound (A'') was replaced by a known photo-polymerizable resin synthesized in accordance with Reference No. 3 (Control 2) are given in the same table.

Reference No. 1

A reactor equipped with a stirrer was charged with 100 parts of dioxane and 140 parts of 4-vinylcyclohexene dioxide, and maintained at 80°C. under heating. Into the system 260 parts of di-n-butylamine added, consuming an hour. Thereafter the system was allowed to react for 9 hours, to provide an amino compound solution (B-1).

Reference No. 2

A reactor equipped with a stirrer was charged with 296 parts of methyl ethyl ketone, and 348 parts of tolylene diisocyanate (2,4-/2,6-tolylene diisocyanate = 65/35), and maintained at 30°C. Under such temperature 356 parts of N,N-dimethylaminoethanol were dropped into the reactor, which required 3 hours. After the subsequent 3 hours reaction, an amino compound solution (B-2) was prepared.

Reference No. 3

An unsaturated polyester resin having an acid value of 40 which was prepared from 1.0 mol of phthalic anhydride, 1.0 mol of maleic anhydride, and 2.1 mols of propylene glycol according to the accepted practice, was stabilized with 0.01 % of hydroquinone, and then dissolved in styrene to provide a styrene solution of unsaturated polyester resin containing 65 % of non-volatile component.

From the foregoing results, it is confirmed that the presence of compound (B) in the compositions notably affects the latters' hardening time. Furthermore, conspicuous difference in hardening time is recognized between the compositions of this invention and conventional photo-polymerizable resin.

EXAMPLE 46

A reactor equipped with a stirrer was charged with 564 parts of xylylene diisocyanate (isomers' mixing ratio : m-/p-xylylene diisocyanate = 70 — 75/30 — ≅), 220 parts of ethyl acrylate, 220 parts of n-butyl acrylate, 0.24 part of p-benzoquinone, 2.0 parts of triethylamine, and 2.0 parts of dimethylbenzylamine, and maintained at 70°C. under heating. Into the reactor 208

Table 3

| Example No. | Compound (B) Type | Amount (part) | Hardening time (sec.) |
|---|---|---|---|
| 25 | Triethanolamine | 14.9 | 10 |
| 26 | Triethylamine | 10.1 | 10 |
| 27 | Tri-n-butylamine | 18.5 | 10 |
| 28 | Tribenzylamine | 28.7 | 15 |
| 29 | Dimethylaniline | 12.1 | 10 |
| 30 | N-methylmorpholine | 10.1 | 9 |
| 31 | N-ethylmorpholine | 11.5 | 9 |
| 32 | Dimethylaminoethyl methacrylate | 15.8 | 15 |
| 33 | Diethylaminoethyl methacrylate | 18.6 | 15 |
| 34 | Triisopropanolamine | 19.1 | 12 |
| 35 | N-methyl-N,N-diethanolamine | 11.9 | 9 |
| 36 | Dimethylaminoethanol | 8.9 | 10 |
| 37 | Amino compound solution obtained by Reference No. 1 (B-1) | 25.0 | 14 |
| 38 | Amino compound solution obtained by Reference No. 2 (B-2) | 25.0 | 13 |
| 39 | Diisobutylamine | 12.9 | 16 |
| 40 | Morpholine | 8.7 | 11 |
| 41 | N-(2-hydroxyethyl) ethylenediamine | 10.4 | 13 |
| 42 | Diethanolamine | 10.5 | 14 |
| 43 | N-aminoethylmorpholine | 13.0 | 14 |
| 44 | Triethanolamine | 5.0 | 12 |
| 45 | Triethanolamine | 2.0 | 14 |
| Control 1 | — | 0 | 25 |
| Control 2 | Known photo-polymerizable resin obtained by Reference No. 3 | | 70 |

parts of neopentyl glycol were dropped over an hour, followed by 3 hours reaction. Thereafter a mixture of 116 parts of 2-hydroxyethyl acrylate and 130 parts of 2-hydroxyethyl methacrylate was dropped into the system at 70°C., consuming an hour. After subsequent 4 hours reaction, 45 parts of dibutyl phthalate, 15 parts of benzoin methyl ether, and 10 parts of benzophenone were added to the system, to provide a photopolymerizable composition in accordance with the invention.

This composition was daubed onto a sheet of plywood at a ratio of 80 g/m² with a roller coater, and onto which Japanese paper was superposed with a laminator. Upon irradiation of the laminated article with the active light from a 2 KW high pressure mercury lamp (product of Philips N. V. Holland, Model HTQ-7; length of emitting part: 750 mm) in air, at an irradiation distance of 15 cm, for 10 seconds, beautiful overlay plywood was obtained, in which the coating was perfectly hardened.

EXAMPLE 47

A reactor equipped with a reflux condenser attached with a water-separating trap, nitrogen gas inlet tube, thermometer and a stirrer was charged with 270 parts of adipic acid, 20 parts of maleic anhydride, 350 parts of neopentyl glycol, and 13 parts of xylol. The content was gradually heated to 240°C., and thereafter maintained at such temperature. The water formed with the progress of reaction was removed, and a polyester intermediate product having an acid value of 15 was obtained.

Another reactor also equipped with a stirrer was charged with 283 parts of this intermediate product, 128 parts of ethyl acrylate, 20 parts of styrene, 0.14 part of p-benzoquinone, and 0.66 part of tri-n-butylamine. While the system was maintained at 45°C. under heating, 165 parts of tolyelne diisocyanate (2,4-/2,6-tolylene diisocyanate = 80/20) was dropped thereinto over an hour, and thereafter the system was heated to 70°C., followed by 2.5 hours reaction at such temperature. Further 130 parts of 2-hydroxyethyl acrylate were dropped into the system at 70°C. for 30 minutes, followed by 8 hours reaction. Thus an ethyl acrylate/2-hydroxyethyl acrylate solution of compound (A'') was obtained.

In 98 parts of this solution, 2 parts of triethanolamine and 1 part of benzoin isopropyl ether were dissolved homogeneously, to provide a photo-polymerizable composition of this invention.

The composition was daubed onto a piece of sheet glass, and onto which untreated polypropylene film was adhered. The article was irradiated with the same active light as employed in Example 46, at an irradiation distance of 15 cm, for 13 seconds. Thereafter the polypropylene film was peeled off from the completely hardened coating of the composition on the glass.

EXAMPLE 48

A reactor equipped with a stirrer was charged with 700 parts of "Desmodur N-75" (ethyl acetate/xylol solution containing 75 % of polyfunctional isocyanate component), 280 parts of methyl methacrylate, 0.3 part of p-benzoquinone, and 1.0 part of dibutyltin dilaurate. While the system was heated and maintained at 70°C., a mixed solution of 116 parts of 2-hydroxyethyl acrylate and 260 parts of 2-hydroxyethyl methacrylate was dropped thereinto, consuming 1.5 hours, and the system was allowed to react for the subsequent 7 hours, to provide an ethyl acetate/xylol/-methyl methacrylate solution of compound (A'').

Eighty parts of this solution, 1 part of benzoin methyl ether, and 1 part of diphenyl disulfide were homogeneously dissolved in 20 parts of the solution formed by dissolving 8 parts of "Polyvinyl Pyrrolidone K-30" (product of General Aniline & Film Co.) in a mixture of 12 parts of triethanolamine with 8 parts of methyl ethyl ketone, to form a photo-polymerizable composition of this invention.

This composition was daubed onto a sheet of plywood, and irradiated with the active light similarly to Example 46, except that the irradiation time was 30 seconds. The composition was completely hardened.

EXAMPLE 49

Into 530 parts of tolylene diisocyanate (2,4-/2,6-tolylene diisocyanate = 80/20) charged in a reactor and maintained at 60°C., 2,600 parts of "Polyglycol 15-200" (polyetherpolyol commercialized by Dow Chemicals Inc., having an average molecular weight of approximately 2,600) which had been pre-heated to 60°C. were dropped, consuming an hour, and thereafter the system was reacted for 5 hours. A mixed solution composed of 500 parts of methyl methacrylate, 700 parts of 2-hydroxyethyl methacrylate, and 0.7 part of p-benzoquinone was then dropped into the system over 30 minutes, followed by 4 hours reaction. Further 200 parts of methyl methacrylate and 10 parts of ethylene glycol dimethacrylate were added and mixed with the system, to provide a solution of compound (A''). One-hundred parts of this solution, 5 parts of triethanolamine, and 1.2 parts of benzoin methyl ether were mixed to form a photo-polymerizable composition in the form of a homogeneous solution.

The composition was poured onto a sheet of 6-mm thick, polished glass (a) on which rubber spacers were so disposed that the 2-mm thick, hardened resin layer would be formed thereon. Further on the sheet glass, 12microns thick polyethylene terephthalate film, negative film, and another sheet glass (b) which was similar to the sheet glass (a) were superposed by the order stated. The laminated glass structure was irradiated with active light from high pressure mercury lamps (800 W) each spaced by 35 cm from the respective outermost glass layer, for 30 seconds from the glass (a) side, and 3 minutes from the glass (b) side. After the exposure, the polyethylene terephthalate film was peeled off from the photo-hardened layer, and the hardened layer was developed with 25°C. 0.5 % aqueous sodium carbonate. Thus a rubbery elastomer with clear relief images, i.e. flexo printing plate, was obtained. The plate was further irradiated in open air with sunlight in very fine weather, at a right angle to the surface with images for an hour, to be reinforced. The plate after the irradiation had a Shore hardness (A) of 60.

EXAMPLE 50

A reactor equipped with a stirrer was charged with 104.4 parts of tolylene diisocyanate (2,4-/2,6-tolylene diisocyanate= 95/5), 79.0 parts of methyl methacrylate, and 0.02 part of p-benzoquinone. While the system was heated and maintained at 70°C., 26.8 parts of trimethylolpropane which had been pre-heated to 70°C. were dropped thereinto over 2 hours, and the system was allowed to react for subsequent 6 hours. Then a mixed solution of 51.0 parts of 2-hydroxyethyl acrylate, 0.6 part of N-methylmorpholine, and 10.0 parts of methyl methacrylate, was dropped into the reaction system, consuming 30 minutes. After the following 8 hours reaction, 2.5 parts of N-methylmorpholine and 36.0 parts of methyl isobutyl ketone were added to the system, to provide a methyl methacrylate/methyl isobutyl ketone solution of compound (A'') containing 1.8 % of isocyanate radicals.

Fifty-two (52 ) parts of this solution were thoroughly mixed with 1.0 part of benzophenone and 0.5 part of isobutyl methacrylate solution containing 1.0 % of "Silicone No. 11 Paint Additive" (product of Dow Corning Corp., U.S.A.) into a homogeneous solution, and into which further 45 parts of talc of 80 microns in average grain size, 5 parts of "Aerosyl 2491" (product of DEGUSSA A.G., West Germany), and 10 parts of methyl isobutyl ketone were added, and mixed with a dispersing stirrer for 15 minutes, to provide a photo-polymerizable composition.

The composition was daubed onto a sheet of plywood at a ratio to provide a dry coating of approximately 130 $g/m^2$, with a bar coater, and allowed to stand for 1 minute under normal temperature. The daubed surface was then irradiated for 10 seconds with active light from a 2 KW high pressure mercury lamp, in air, at an irradiation distance of 15 cm. The hardened coating was well suited as a wood sealer.

EXAMPLE 51

A reactor equipped with a stirrer was charged with 696 parts of tolylene diisocyanate (2,4-/2,6-tolylene diisocyanate = 80/20), 520 parts of ethyl acetate (reaction solvent), and 0.52 part of p-benzoquinone. While the system was heated and maintained at 70°C., 520 parts of 2-hydroxypropyl acrylate were dropped thereinto consuming 2 hours. Then the system was reacted for 4 hours, to provide an isocyanate solution.

Separately, another reactor with a stirring means was charged with 280 parts of linseed oil fatty acid, 0.3 part of p-benzoquinone, and 0.4 part of 2-methylimidazole, while the content was heated and maintained at 100°C., 142 parts of glycidyl methacrylate were dropped thereinto over 2 hours, and thereafter the system was allowed to react for 5 hours. Thus a brown, transparent ester solution of an acid value of 17 was obtained. The solution was cooled to 70°C., and into which 434 parts of above isocyanate solution and 0.6 part of tri-n-butylamine were dropped, consuming 2 hours, followed by 4 hours reaction. Thus an ethyl acetate solution of compound (A'') was obtained.

To 80 parts of this solution, 20 parts of "Brilliant Carmine 6B" as pigment, 5 parts of benzoin methyl ether, and 10 parts of morpholine were added, and milled well while a part of the ethyl acetate was evaporated, by means of three rolls.

The photo-polymerizable composition was extended, and spread on a sheet of high quality paper with a spatula, and irradiated similarly to Example 46 except that the irradiation time was 5 seconds. The coating was completely dry and well hardened at the end of the irradiation.

We claim:

1. A photo-polymerizable composition containing a polymerizable compound having an average molecular weight within the range of 144 – 100,000, said polymerizable compound having 0.01 – 1.0 urethane linkage based on an average molecular weight of 100, with 0.001 – 1.0 radical or linkage selected from the group consisting of a secondary amino radical, tertiary amino radical, urea linkage or mixture thereof based on an average molecular weight of 100 and 0.02– 1.0 ethylenically unsaturated double bond based on an average molecular weight of 100; and 0.001 – 10 % of a photo-polymerization initiator based on the total weight of the photo-polymerizable composition.

2. The composition of claim 1, wherein said polymerizable compound is the reaction product of a polyisocyanate compound with a hydroxy compound containing an ethylenically unsaturated double bond and a tertiary amine compound containing a hydroxyl group.

3. The composition of claim 1, wherein said polymerizable compound is the reaction product of a polyisocyanate compound with a hydroxy compound containing an ethylenically unsaturated double bond, a tertiary amine compound containing a hydroxyl group and a saturated polyhydroxy compound.

4. The composition of claim 1, wherein said polymerizable compound is the reaction product of a polyisocyanate compound with a hydroxy compound containing an ethylenically unsaturated double bond and a primary or secondary amine compound.

5. The composition of claim 1, wherein said polymerizable compound is the reaction product of a polyisocyanate compound with a hydroxy compound containing an ethylenically unsaturated double bond, a primary or secondary amine compound and a saturated polyhydroxy compound.

6. The composition of claim 1, wherein said polymerizable compound is prepared by reacting the reaction product of an epoxy-group containing compound with a primary or secondary amine compound, with a polyisocyanate compound and a hydroxy compound containing an ethylenically unsaturated double bond.

7. A photo-polymerizable composition containing a polymerizable compound having an average molecular weight in the range of 144 – 100,000, said polymerizable compound having 0.01 – 1.0 urethane linkage based on an average molecular weight of 100 with 0.001 – 1.0 radical or linkage selected from the group consisting of a secondary amino radical, tertiary amino radical, urea linkage or mixture thereof based on an average molecular weight of 100 and 0.02 – 1.0 ethylenically unsaturated double bond based on an average molecular weight of 100; 0.001 – 10 % of a photopolymerization initiator based on the total weight of the photopolymerization composition; and an ethylenically unsaturated monomer.

* * * * *

UNITED STATES PATENT OFFICE
CERTIFICATE OF CORRECTION

PATENT NO. : 3,864,133

DATED : February 4, 1975

INVENTOR(S) : HIROYOSHI HISAMATSU ET AL

It is certified that error appears in the above-identified patent and that said Letters Patent are hereby corrected as shown below:

In the Heading under "Foreign Application Priority Data", correct line 1 to read as follows:

-- Aug. 11, 1970 Japan 45-69688 --

Signed and sealed this 22nd day of April 1975.

(SEAL)
Attest:

RUTH C. MASON
Attesting Officer

C. MARSHALL DANN
Commissioner of Patents
and Trademarks